United States Patent [19]

White, Jr.

[11] Patent Number: 5,458,946
[45] Date of Patent: Oct. 17, 1995

[54] ATTACHABLE RETAINER FOR A TAPE MEASURE

[76] Inventor: Willie O. White, Jr., P.O. Box 927, Dunn, N.C. 28335

[21] Appl. No.: 262,000

[22] Filed: Jun. 17, 1994

[51] Int. Cl.$^6$ ............................................. G01B 3/10
[52] U.S. Cl. ..................... 428/131; 428/136; 428/121; 428/192; 428/81; 428/174; 33/758; 33/770; 33/757; 220/229
[58] Field of Search ............................... 428/131, 136, 428/121, 192, 81, 174; 33/758, 770, 757; 220/229

[56] References Cited

U.S. PATENT DOCUMENTS

| | | | |
|---|---|---|---|
| 2,453,115 | 11/1948 | Brown | 33/770 |
| 4,353,167 | 10/1982 | Marvin | 33/770 |
| 4,438,865 | 3/1984 | Scattaregia | 220/229 |
| 5,025,947 | 6/1991 | Leone | 220/229 |
| 5,231,769 | 8/1993 | Mahan | 33/758 |
| 5,295,308 | 3/1994 | Stevens et al. | 33/770 |

FOREIGN PATENT DOCUMENTS 0155903  8/1985  Japan.

*Primary Examiner*—William P. Watkins, III
*Attorney, Agent, or Firm*—Rhodes, Coats and Bennett

[57] ABSTRACT

The present invention relates to a retainer designed to fit on the end of a flexible tape of the extendable and retractable type that can be housed within a housing. The retainer in a preferred embodiment assumes a cap-like configuration and includes a back with a surrounding retainer ring. Formed in the back is a slit through which an L-shape end that extends from the remote end of the flexible tape can be projected therethrough such that when mounted on the tape the back of the retainer lies adjacent a turned-down catch that forms a part of the L-shaped end of the flexible tape. Thus, the retainer is adapted to receive, hold and retain the end of a member (such as a piece of shoe mold) to be measured.

9 Claims, 3 Drawing Sheets

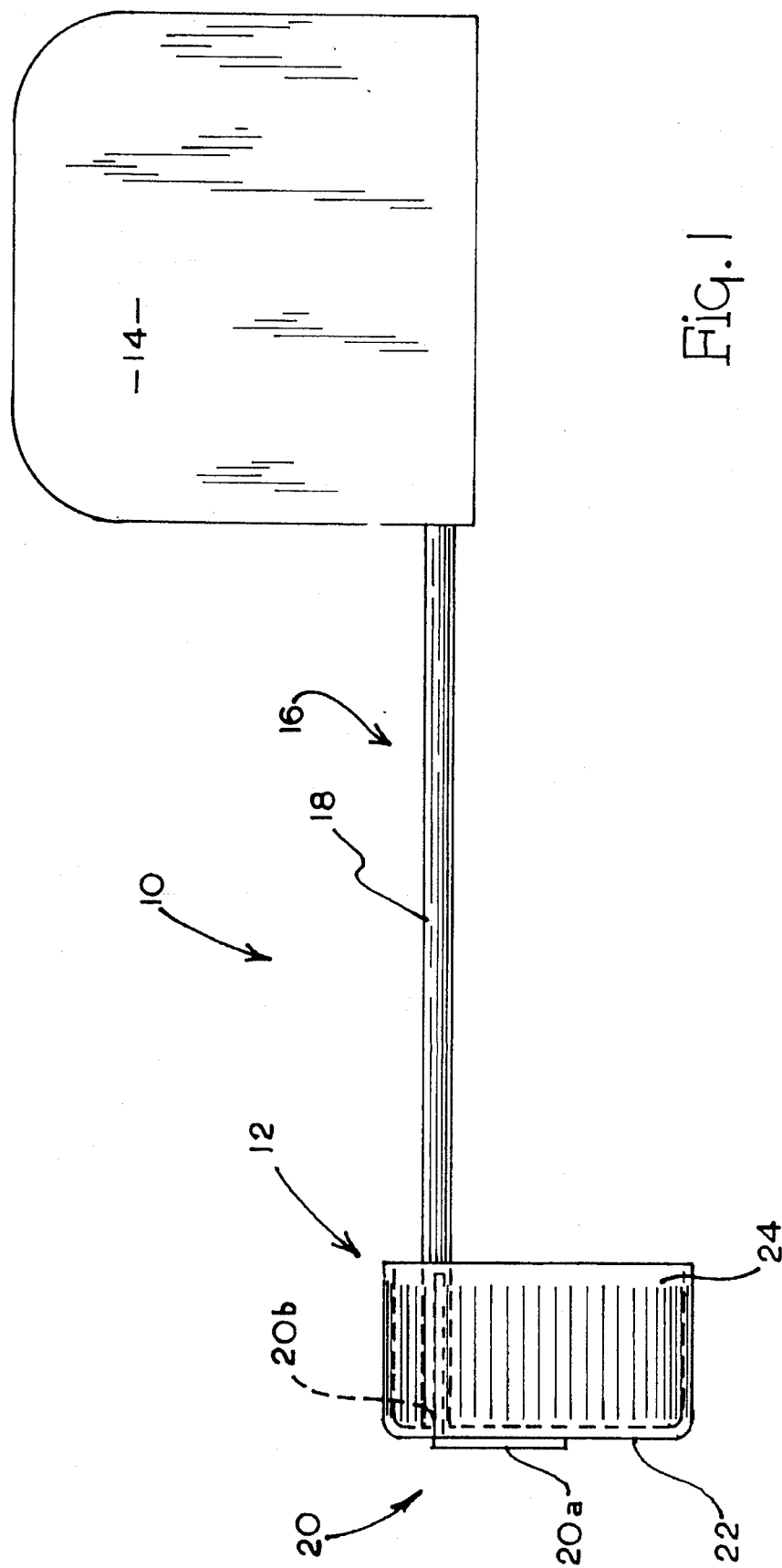

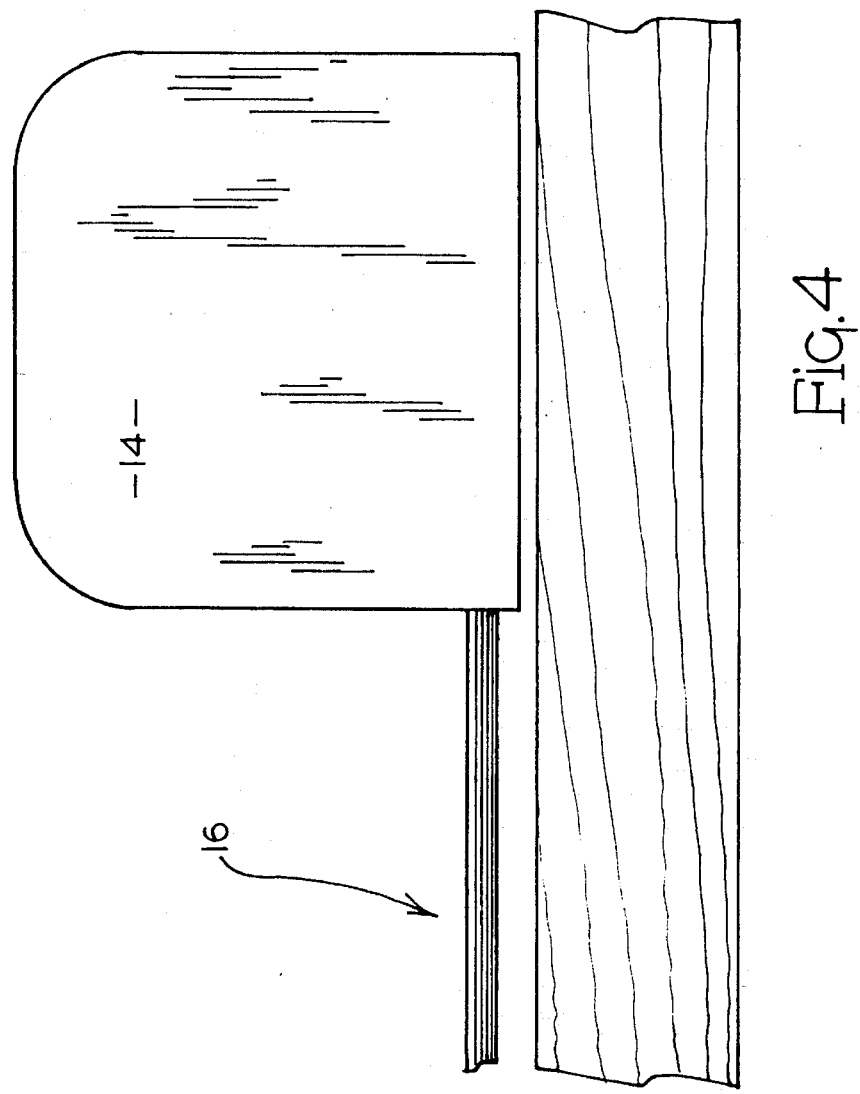
Fig. 4
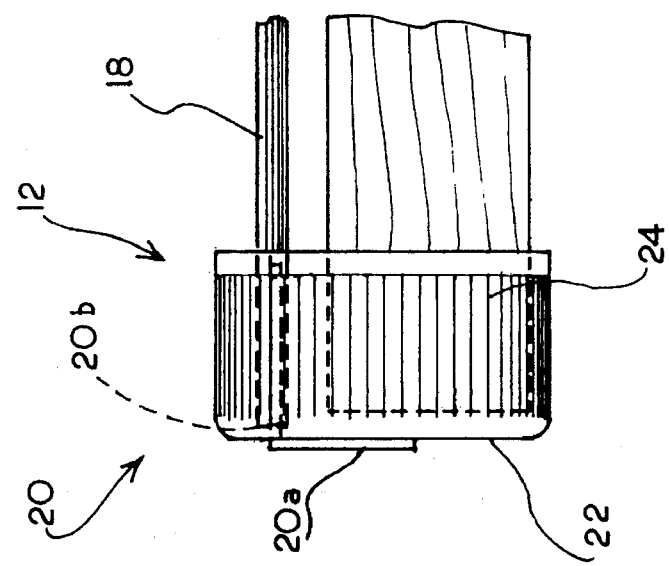

ATTACHABLE RETAINER FOR A TAPE MEASURE

FIELD OF THE INVENTION

The present invention relates to attachments for flexible tapes and more particularly to a cap-like retainer that is designed to be attached and detached with respect to the terminal end of a flexible tape that is of the type that extends from a housing.

BACKGROUND OF THE INVENTION

A flexible tape of the type designed to be held within a housing and which can be extended and retracted with respect to the housing is commonly used by carpenters and other people. Typically, disposed on the outer or remote end of the flexible tape is an L-shaped end portion that includes a turned-down catch that generally extends at a right angle to the tape. The turned-down catch is very beneficial for assisting a person in measuring a distance especially where a starting or end point is such that the catch on the remote end of the tape can be effectively hooked and held stationary while the tape housing is pulled. In fact, there is a great deal of prior art that even goes further inasmuch as certain prior art patents suggest a simple hook-type attachment that is designed to be attachable and detachable with respect to the remote end of the flexible tape. Again, these types of attachments are beneficial in certain situations where the attached hook will in fact anchor or hold the tape in place.

However, these hook-type attachments have many disadvantages and drawbacks in certain applications. For example, consider the problem that a trim carpenter has in cutting a piece of shoe mold to fit below the baseboard in a residential structure. First, the carpenter has to determine the length that the shoe mold should be cut. Then the carpenter has to measure the shoe mold and mark the point of the cut to be made. A simple turned-down catch on a tape or an attached hook will not sufficiently retain itself about the end of a piece of shoe mold such that the carpenter can freely extend the tape from the remote end of the shoe mold without being concerned about the tape end slipping off that remote end. As a consequence, it is difficult for a carpenter or any other person to easily and conveniently measure a member such as a piece of shoe mold.

There is a need for a particular attachment that can be easily attached and detached from the end of the tape that will positively hold and retain the end of a flexible tape at the end of a member, such as a piece of shoe mold, that is to be measured.

SUMMARY AND OBJECTS OF THE INVENTION

The present invention entails an attachable and detachable retainer adapted to fit on the remote end of a flexible tape for engaging, holding and retaining the end of a member to be measured. The retainer conforms to a cap-like configuration and includes an elongated slit that is sized to permit a turned-down catch and its associated horizontal connector that is connected to the end of the flexible tape to be inserted therethrough. Once mounted on the end of the tape, the back of the retainer fits flush against the turned-down catch and the majority of the area of the retainer lies below the flexible tape for receiving the end of a member to be measured.

It is therefore an object of the present invention to provide a retainer for a flexible tape that is adapted to be easily attached and detached to the end of the flexible tape.

Another object of the present invention is to provide an attachable retainer for the remote end of a flexible tape that will enable a carpenter or other person using such a flexible tape to easily measure a member such as a piece of shoe mold or the like.

Another object of the present invention is to provide an attachable retainer of the character referred to above that can be easily made in various sizes to accommodate various size members to be measured.

A further object of the present invention is to provide an attachable and detachable retainer of the character referred to above that is designed to fit on the end of a flexible tape which is simple in construction, easy to manufacture, and relatively inexpensive.

Other objects and advantages of the present invention will become apparent and obvious from a study of the following description and the accompanying drawings which are merely illustrative of such invention.

BRIEF DESCRIPTION OF THE DRAWINGS

FIG. 1 is side elevational view of a flexible tape where the tape is extended from a tape housing and wherein the attachable and detachable retainer of the present invention is mounted or secured on the remote end of the flexible tape.

FIG. 4 is a side view of the flexible tape having the retainer mounted thereon and illustrating the use of the retainer to measure a piece of shoe mold.

DETAILED DESCRIPTION OF THE INVENTION

Figure 3A:
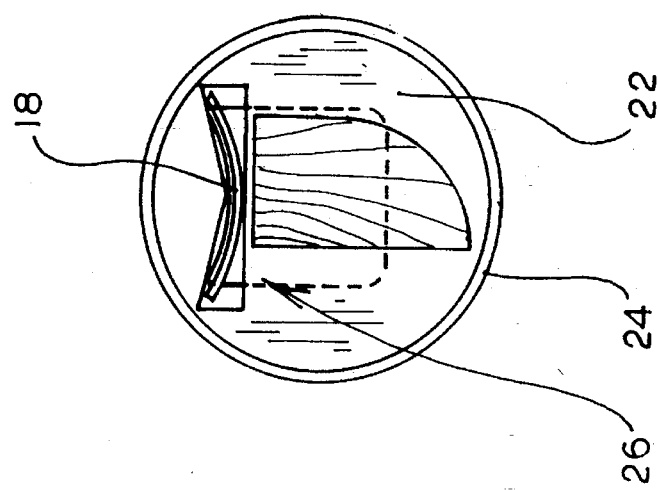
FIG. 3A is a side sectional view showing the retainer of FIG. 3 mounted on the end of a tape and retaining a piece of molding.

With further reference to the drawings, there is shown therein a conventional flexible tape indicated generally by the numeral 10. In FIG. 1, the retainer of the present invention, indicated generally by the numeral 12, is shown mounted on the remote end of the tape 16 that is extendible from a housing 14. It is appreciated that the flexible tape 10 is of the type where the tape 16 can be extended from the housing 12 and stopped at any incremental position. Further, flexible tape 10 is of the type that will automatically retract the tape 16 into the housing 14.

Before discussing the retainer 12 in detail, note that the flexible tape 16 that extends from the housing 14 basically comprises a tape 18 that is flexible and which would of course have numerical increments of length inscribed on the top thereof. Forming a part of the flexible tape 16 is a remote end portion that basically comprises a catch assembly. This catch assembly is referred generally by the numeral 20. Catch assembly 20 includes a turned-down catch 20*a* and a horizontal extension connector 20*b* that effectively connects the catch 20*a* with the tape 18 in conventional fashion.

Now, turning to the retainer 12 of the present invention, it is important to appreciate that this retainer 12 is designed to be easily attached and detached with respect to the remote end of the flexible tape 16. Viewing retainer 12 in more detail, it is seen that the same includes a generally planer back 22 that in the case of the embodiment shown herein is of a circular configuration. Formed about the periphery of the back 22 is a retainer ring 24 that projects therefrom with the retainer ring basically disposed at a right angle to the back 22. The length or depth of the retainer ring 24 can vary depending upon the need or application. Thus, it is appreciated that the retainer because of the structure of the back 22 and the retainer ring 24 forms a cap-like configuration.

Formed in the back 22 is elongated slit 26. The slit includes opposed elongated edges 26a. Note that the slit 26 is offset from the center of the back 22 and in fact is positioned relatively close to a segment of the retainer ring 24.

Defined within the bounds of the retainer ring 24 and the back 22 is a holding area. As will be appreciated from subsequent portions of this disclosure this defined holding area is designed to accept and retain the end of a member that has been measured by the flexible tape 10.

The slit 26 is particularly sized with respect to the end catch 20 formed on the remote end of the tape 18. In particular, the slit 26 is sized such that the catch 20a can be inserted therethrough and such that the portion of the tape extending from the top end of the catch can also extend through the slit 26. The slit 26 is sized so as to firmly grasp the remote end of the tape 18 when the retainer is placed on the end of the tape as shown in FIG. 1. Note that when the retainer 12 is placed on the end of the tape that the catch 20a lies flush against the exterior side of the back 22. This tends to prevent the retainer 12 from moving clockwise on the end of the tape as viewed in FIG. 1.

Figure 3:
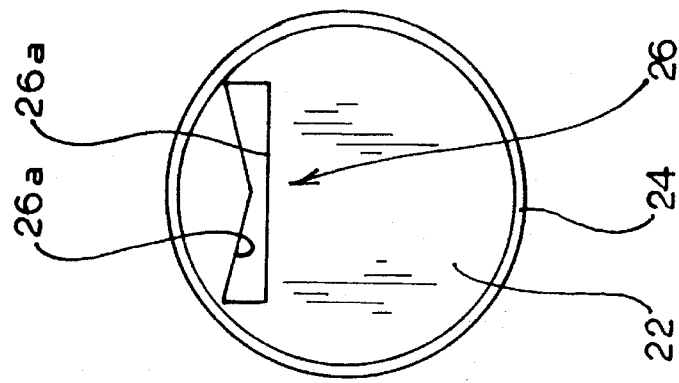
FIG. 3 is a side elevational view of a second design of the retainer, again as viewed from the interior side, with the elongated slit being provided in the retainer having at least one edge of a generally V-shape.
Figure 2:
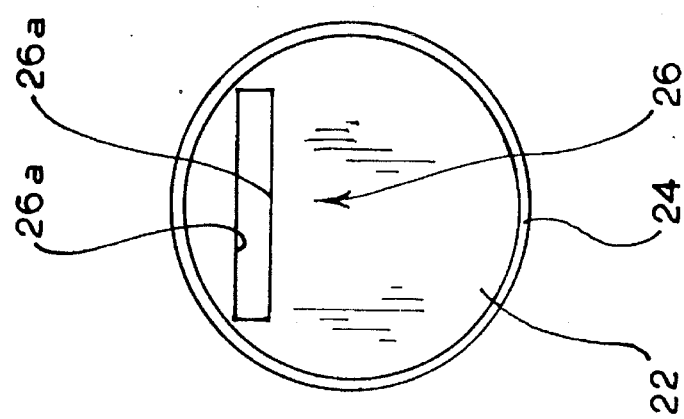
FIG. 2 is a side elevational view of the retainer of the present invention as viewed from the interior side.

Now, with respect to FIG. 3, a retainer 12 of the second design is shown therein and this retainer is essentially the same in design as that already discussed with the exception that the slit 26 conforms to a slightly different shape. In this case, one opposed edge 26a of the slit 26 is formed in a generally V-shape such that the slit is somewhat more narrow intermediate its opposed ends. This design causes the slit 26 to more aggressively grip the end of the tape 18 when the retainer 12 is mounted on the end of the tape. It is appreciated that the shape of "V" could vary to provide any type of grip of the tape. This type of retainer 12 may be more effective for some flexible tape designs.

It is appreciated that once the retainer 12 has been attached to the remote end of the tape 18, that a member to be measured can be inserted into the defined holding area of the retainer and the tape housing pulled along the member a selected distance. For example, if a carpenter is measuring a piece of shoe mold a remote end of the shoe mold can be inserted into the retainer and confined therein during the measuring process. A slight force can be maintained on the element or member being measured in the direction of the back 22 to effectively stabilize the retainer 12 on the end of the tape. It is appreciated that the size and shape of the retainer 12 may vary depending on the application or need of the carpenter using the flexible tape 10. But as illustrated in the drawings, it is contemplated that the slit 26 would be offset with respect to the back 22 such that a majority area of the back would effectively lie below the tape 18 as viewed for example in FIG. 1. As already noted, the depth or length of the retainer ring 24 can vary again according to need and application.

The retainer 12 may be manufactured from any suitable material such as plastic. However, it is deemed desirable to manufacture the retainer out of economical material such that the retainer 12 can be sold at a fairly inexpensive price.

From the foregoing specification and discussion, it is appreciated that the retainer 12 of the present invention presents a simple and effective attachable and detachable device for a flexible tape that enables a carpenter or any other person using a flexible tape to easily and conveniently measure a member such a s piece of shoe mold or the like. For example, see the illustration in FIG. 4. The retainer 12 can be easily attached and detached from the remote end of the tape 18.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A combination of a tape measure and a detachable and attachable retainer, comprising:
   a) a flexible tape measure having a main body housing and a flexible measuring tape with an L-shaped end that is extendible therefrom and wherein the L-shaped end includes a horizontal extension connector and a turned-down catch; and
   b) a detachable and attachable retainer for fitting onto the L-shaped end of the flexible tape, the retainer including:
      i) a backing having an area substantially greater than the area of the catch and having exterior and interior sides and an outside periphery extending around the backing;
      ii) an elongated slit formed in the backing;
      iii) the elongated slit being adapted to receive the catch completely therethrough such that the catch lies adjacent the exterior side of the backing and the horizontal extension connector extends through the slit;
      iv) the elongated slit being positioned off center with respect to the backing such that when the backing is attached to the end of the measuring tape a majority of the area of the backing lies below the slit; and
      v) a retainer ring projecting from the periphery of the backing and directed such that the retainer ring projects away from the catch and towards the housing of the tape measure, the retainer ring forming a retainer around the edge of the backing for holding and retaining the ends of a member being measured.

2. The combination of claim 1 wherein the retainer ring projects from the backing at an angle approximately normal to the backing.

3. The combination of claim 1 wherein the backing is substantially circular and wherein the retainer ring conforms to the circular shape of the backing such that the retainer assumes a cap-shaped configuration.

4. The combination of claim 1 wherein the slit includes opposed elongated edges and wherein at least one of the elongated edges is at least slightly V-shaped so as to exert a more positive holding effect on that portion of the tape that extends through the slit.

5. The combination of claim 4 wherein the V-shaped edge of the slit is disposed on the uppermost edge of the slit when the retainer is secured on the end of a flexible tape.

6. A combination of a tape measure and a detachable and attachable retainer, comprising: a flexible tape measure having a main body housing and a flexible measuring tape with an L-shaped end that is extendible therefrom and wherein the L-shaped end includes a horizontal extension connector and a turned-down catch and an attachable and detachable retainer for fitting onto the L-shaped end of the flexible measuring tape, the retainer including a back having a slit formed therein for receiving an end portion of the measuring tape such that the retainer may be supported on the end of the measuring tape inwardly of the catch such that the catch lies adjacent an exterior side of the retainer, the slit being particularly adapted to allow the catch and horizontal extension connector to be inserted therethrough such that in an attached position the catch lies adjacent the exterior side of the back while the horizontal extension connector extends through the slit such that the retainer is entirely supported on the end of the flexible tape, and a retaining ring projecting from an outer periphery of the back towards the housing of the tape measure so as to define a holding and retaining area at the end of the measuring tape for receiving and retaining the end of a member to be measured.

7. The combination of claim 6 wherein the slit is offset with respect to the back such that a majority of the area of the back lies adjacent the area occupied by the catch when the retainer is mounted on the end of the flexible tape.

8. The combination of claim 7 wherein the elongated slit includes opposed elongated edges and wherein one edge is generally V-shaped resulting in the slit having a more narrow width intermediate its ends for positively retaining the end of the flexible tape therein.

9. The combination of claim 6 wherein the retainer assumes a cap-shaped configuration.

* * * * *